United States Patent [19]

Tsubata et al.

[11] Patent Number: 4,859,120
[45] Date of Patent: Aug. 22, 1989

[54] PNEUMATIC CONVEYING SYSTEM

[75] Inventors: Yukihiro Tsubata; Masaru Shiino, both of Minami-ashigara, Japan

[73] Assignee: Fuji Photo Film Co., Ltd., Kanagawa, Japan

[21] Appl. No.: 144,145

[22] Filed: Jan. 15, 1988

[30] Foreign Application Priority Data

Jan. 16, 1987 [JP] Japan .................................. 62-7517
Jan. 19, 1987 [JP] Japan .................................. 62-9427

[51] Int. Cl.⁴ ............................................ B65G 51/20
[52] U.S. Cl. ..................................... 406/84; 209/906; 285/236
[58] Field of Search .................... 406/51, 83, 151, 153, 406/84; 209/93, 509, 651, 657, 906, 911, 933; 285/236

[56] References Cited

U.S. PATENT DOCUMENTS

| | | | |
|---|---|---|---|
| 3,096,882 | 7/1963 | Tyler | 209/906 |
| 3,268,245 | 8/1966 | Wood | 285/236 |
| 3,711,038 | 1/1973 | Van O'Heren | 406/84 |
| 3,784,006 | 1/1974 | Braun | 209/906 |
| 3,843,203 | 10/1974 | Golland et al. | 406/84 |
| 4,358,226 | 11/1982 | Nagata et al. | 406/84 |
| 4,609,108 | 9/1986 | Hristozov et al. | 209/906 |
| 4,688,679 | 8/1987 | Lindgren | 209/906 |

FOREIGN PATENT DOCUMENTS 3410901 10/1985 Fed. Rep. of Germany ...... 209/657

Primary Examiner—Sherman D. Basinger
Assistant Examiner—Thomas J. Brahan
Attorney, Agent, or Firm—Sughrue, Mion, Zinn, Macpeak & Seas

[57] ABSTRACT

A pneumatic conveying system for conveying articles to be conveyed, which are successively discharged from an assembling machine, to a plurality of conveying positions. In this pneumatic conveying system, pneumatic conveying and conveyor conveying are combinedly used, whereby conveying for a relatively long distance is effected by pneumatic conveying low in cost per unit conveying distance, and conveying for distributing the articles to be conveyed to the plurality of conveying positions is effected by conveyor conveying easy in distributing. Furthermore, transfer from the pneumatic conveying of the articles to be conveyed to the conveyor conveying is made smooth, and flaw control measure and blocking preventive measure for the articles to be conveyed are applied.

3 Claims, 5 Drawing Sheets

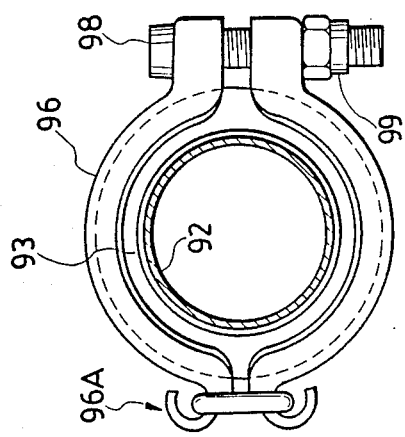
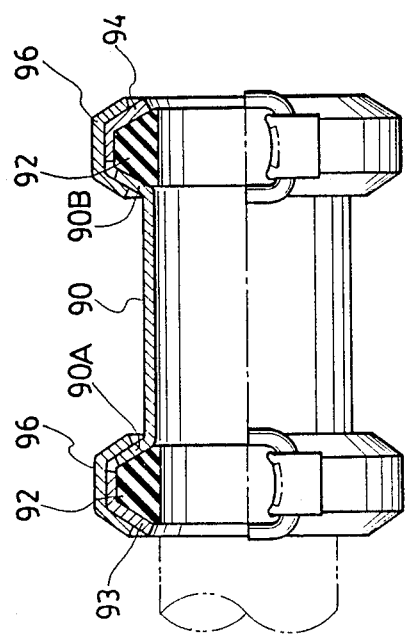
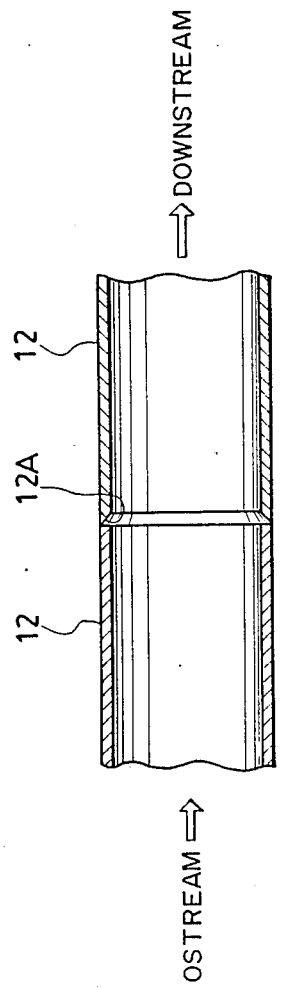

PNEUMATIC CONVEYING SYSTEM

BACKGROUND OF THE INVENTION

1. Field of the Invention

This invention relates to pneumatic conveying systems, and more particularly to a pneumatic conveying system for conveying articles to be conveyed, which are successively discharged from an assembling machine, to a plurality of conveying positions.

2. Description of the Related Art

As a conveying system for conveying articles to be conveyed, which are successively discharged from an assembling machine, to a plurality of conveying positions, a system using a conveyor has been known. However, this type of conveying system is disadvantageous in that the longer the conveying distance is, the higher the initial cost of the equipment becomes.

Then, a pneumatic conveying system which is low in cost has been proposed, including one using air shooter capsules (special purpose capsules for conveying) (bulletins of Japanese Patent Kokai (Laid-Open) Nos. 152713/1983 and 152714/1983). In these air shooter capsule conveying methods, the articles to be conveyed are automatically housed in air shooter capsules, the air shooter capsules are delivered to a sending station, and the air shooter capsules are pneumatically conveyed from this sending station to a plurality of receiving stations connected to this sending station through a pneumatic tube. Furthermore, in pneumatically conveying the air shooter capsule to a desirable receiving station, a switch provided on the pneumatic tube is actuated to switch a route of transportation and so on.

However, since the conventional pneumatic conveying system uses the air shooter capsules, such disadvantages are presented that putting the articles to be conveyed into the air shooter capsules and taking the articles therefrom are complicated, and the system is not suitable for conveying articles in large quantities. Therefore, it has been proposed to directly convey the articles to be conveyed. However, in this case, the air shooter capsules are not used, so that flow control measure for the articles and blocking preventive measure for the articles in a transporting piping should be effected.

SUMMARY OF THE INVENTION

An object of the present invention is to provide a pneumatic conveying system capable of conveying articles in large quantities without damage thereto and suitably carrying the articles to desirable positions out of a plurality of conveying positions.

Another object of the present invention is to provide a piping joint construction in a pneumatic conveying system, wherein jointing of pipings is easy, center alignment between the pipings to be jointed can be accurately performed, and no difference in stage occurs between portions of pipings to be jointed.

To achieve the above-described ofjects, the present invention comtemplates a pneumatic conveying system for conveying articles to be conveyed, which are successively discharged from an assembling machine, to a plurality of conveying positions, comprising:

a distributing conveyor provided along the plurality of conveying positions;

scrapers for causing the articles to be conveyed on the distributing conveyor to be selectively dropped to any position out of the plurality of conveying positions;

a transporting piping provided on the inlet side thereof with a receiving opening for receiving the articles to be conveyed, which are successively discharged from the assembling machine, and provided on the outlet side thereof with a shooter for causing the articles to be conveyed to the front of the distributing conveyor;

an ejector provided at a position close to the outlet side of the transporting piping, for sending out conveying wind power to pneumatically convey the articles to be conveyed toward the outlet side of the transporting piping; and a stall device interposed between the ejector and the outlet side of the transporting piping, for stalling the speed of the articles to be conveyed.

More specifically, according to the present invention, pneumatic conveying and conveyor conveying are combinedly used, whereby conveying for a relatively long distance is pneumatically effected, and thereafter, in conveying the articles to be conveyed to the plurality of conveying positions, the distributing conveyor and the scrapers are used to cause the articles to be selectively dropped to the desirable conveying positions. Furthermore, the wind power for transporting the articles is provided at a position close to the outlet side of the transporting piping, whereby the articles are prevented from blocking the outlet or thereabout, and further, the speeds of the articles are stalled by the stall device interposed between the ejector and the outlet of the transporting piping, so that flows and the like are not caused to the articles at the time of discharge from the transporting piping.

Furthermore, as a preferably joint construction of the transporting piping in the pneumatic conveying system, there is used a piping joint construction comprising:

two holding members abutting contact with outer side surfaces of two ring-shaped packings, respectively the two ring-shaped packings being secured to the outer peripheries of pipes to be jointed;

a straight-tubular sleeve having an inner diameter equal to outer diameters of the pipes and provided at opposite ends thereof with flange portions in abutting contact with inner side surfaces of the two packings, respectively;

two coupling members surrounding the flange portions of the sleeve and the holding members and clamping the flange portions and the holding members.

More specifically, in this piping joint construction, the pipes abutted against each other are surrounded by the sleeve having the inner diameter equal to the outer diameters of the pipes, so that the center alignment between the pipes can be automatically effected. Furthermore, the opposite ends of this sleeve are clamped by the coupling members through the packings and the holding members, so that a shift in center alignment and leakage can be prevented after the mounting, and mounting and demounting can be performed at a stroke.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 is a front view, partially sectional, showing an example of the piping joint construction illustrated in FIG. 1;

FIG. 6 is a side view of FIG. 5; and

FIG. 7 is a sectional view showing the abutted, portions of the pipes to be jointed.

DETAILED DESCRIPTION OF THE INVENTION

Detailed description will hereunder be given of the preferred embodiment of a pneumatic conveying system according to the present invention with reference to the accompanying drawings.

Figure 1:
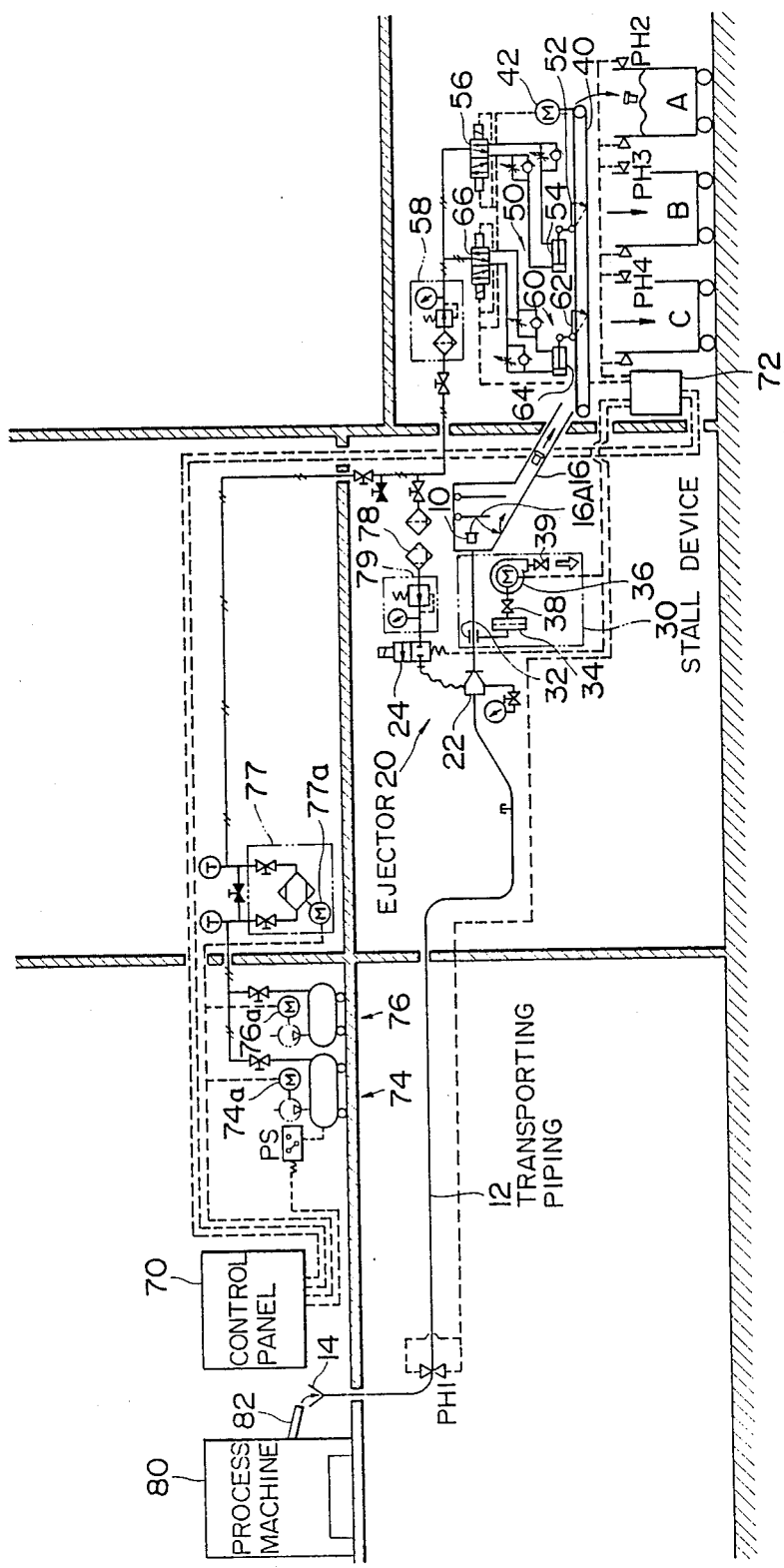
FIG. 1 is a block diagram generally showing one embodiment of the pneumatic conveying system according to the present invention.

FIG. 1 is the block diagram generally showing one embodiment of the pneumatic conveying system according to the present invention. this pneumatic conveying system is adapted to convey cylindrical cases 10, in each of which a roll film magazine as being an article t be conveyed is housed, (hereinafter referred to as "P cases") from an assembling machine 80 to small silos A, B and C by combined use of pneumatic conveying and conveyor conveying.

The pneumatic conveying system is principally constituted by a transporting piping 12, an ejector 20, a stall device 30, a distributing conveyor 40, scrapers 50 and 60, a control panel 70, a manual operator control panel 72, and air pressure sources 74 and 76, etc.

The transporting piping 12 is provided on the inlet side thereof with a conical receiving opening 14 for directly receiving the P cases 10 successively discharged from a shooter 82 of the assembling machine 80 (Refer to FIG. 2), and provided on the outlet side thereof with a shooter 16 for dropping the P cases 10 into the distributing conveyor 40. Incidentally, provided in this shooter 16 is a curtain 16A for absorbing impacts of the P cases 10.

Figure 3:
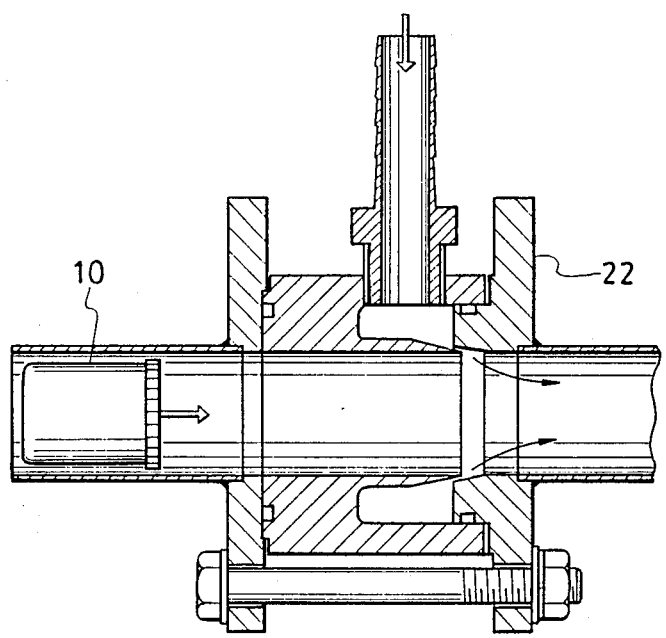
FIG. 3 is a sectional view showing an ejector nozzle of the ejector illustrated in FIG. 1.

The ejector 20 is adapted to send out conveying wind power toward the outlet of the transporting piping 12, and is constituted by an ejector nozzle portion 22 (Refer to FIG. 3), an electromagnetic valve 24 and the like. Incidentally, air pressure of a desirable value is applied to the electromagnetic valve 24 from the air pressure source 74 or 76 through a dehumidifier 77, a mist separator 78 and an air regulator 79.

Figure 4:
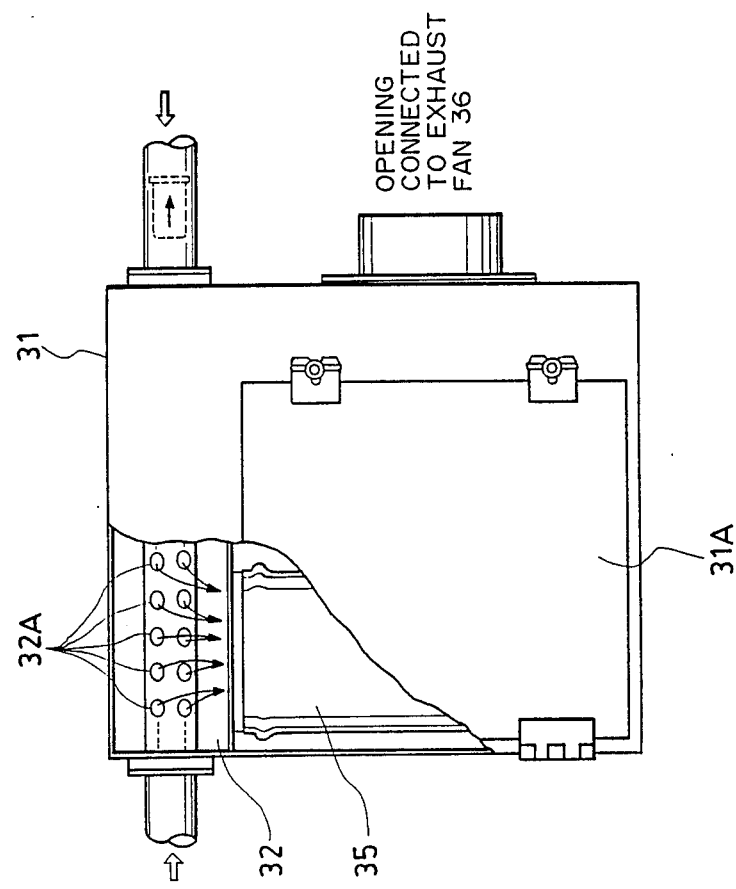
FIG. 4 is a front view, partially broken away, showing an example of a chamber of the stall device illustrated in FIG. 1.

The stall device 30 is adapted to stall the speeds of the P cases 10, which are pneumatically conveyed, and, as shown in FIG. 4, is constituted by a chamber 31 housing a portion of the transporting piping 12, a suction portion 32 formed by providing a multiplicity of air vents 32A on the transporting piping 12 housed in this chamber 31, an exhaust fan 36 for sucking air from this suction portion 32 through a filter 34, and wind regulating valves 38 and 39, which are provided on the inlet and outlet sides of the exhaust fan 36, respectively.

The multiplicity of air vents 32A each have a size so as not to hinder the conveying of the P cases 10, which are pneumatically conveyed through the transporting piping 12. Furthermore, the suction portion formed therein with these air vents 32A are provided at a position spaced 600 mm apart from the outlet side of the transporting piping 12.

The filter 34 is provided in an air duct 35 extending from the suction portion 32 to the wind regulating valve 38, and is adapted to absorb abraded powder of the P cases 10, dust and the like, to thereby filter the exhaust wind. Additionally, this filter 34 is replaceable through a door 31A provided on the chamber 31.

The exhaust fan 36 is adapted to such and exhaust air from the suction portion 32 through the filter 34, and an exhaust air flow rate thereof can be regulated by the openings of the wind regulating valve 38 and 39, which are provided on the inlet and outlet sides thereof, respectively.

The distributing conveyor 40 is adapted to convey the P cases 10, which are dropped from the shooter 16, and driven by a motor 42. Provided at suitable positions of this distributing conveyor 40 are scrapers 50 and 60 for dropping the P cases 10 on the distributing conveyor 40 into small silos B and C, which are located at conveying positions different from each other. The scraper 50 is constituted by a blade 52, an air cylinder 54 and an electromagnetic valve 56. Similarly, the scraper 60 is constituted by a blade 62, an air cylinder 64 and an electromagnetic valve 66. Additionally, air pressures are applied to the electromagnetic valves 56 and 66 from the air pressure sources 74 and 76, respectively, through a dehumidifier 77 and an air filter regulator 58. Furthermore, the distributing conveyor 40 is adapted to drop the P cases 10 into a small silo A when the blades 52 and 62 of the scrapers 50 and 60 are not operated.

The control panel 70 controls motors 74A, 76A of the air pressure sources 74, 76 and a motor 77A of the dehumidifier 77, and further, controls the electromagnetic valve 24 of the ejector 20, the fan 36 of the stall device 30, the motor 42 of the distributing conveyor 40 and the electromagnetic valves 56, 66 of the scrapers 50, 60, etc. through a manual operator control panel 72. For example, the air pressure source 74 is controlled such that air pressure having a predetermined valve preset by a pressure switch PS of the air pressure source 74 is discharged in response to a signal outputted from the pressure switch PS, and furthermore, the electromagnetic valve 24 of the ejector 20 is controlled (PDM—controlled fro example), so that conveying wind power of a desirable value can be sent out.

Furthermore, a photo-sensor PH 1 is provided in the transporting piping 12, so that the number of the P cases 10 and the like can be controlled. Further, photo-sensors PH2, PH3 and PH4 are provided in the small silos A, B and C, respectively, so that the situations of storage of the P cases 10 in the small silos can be sensed. Incidentally, for example, detection signals of the photo-sensors PH2 to PH4 are used for controlling the scrapers 50, 60 and so on. More specifically, when it is detected that the small silo A is filled up with the P cases 10 by a signal from the photo-sensor PH2, the scraper 50 is brought into the operating condition, whereby the P cases are controlled to be dropped into the small silo B. When it is detected that the small silo B is filled up with the P cases 10 by a signal from the photo-sensor PH3, thereupon, the scraper 60 is operated, whereby the P cases 10 are controlled to be dropped into the small silo C. Additionally, the small silo filled up with the P cases 10 is replaced by a new one while the P cases 10 are dropped into another small silo.

The joint construction of the transporting piping 12 in the pneumatic conveying system will hereunder be described.

FIG. 5 is the front view, partially sectional, showing an example of the piping joint for connecting the pipes of the transporting piping 12. FIG. 6 is the side view of FIG. 5.

As shown in these drawings, this piping joint is constituted by a sleeve 90, gaskets 92, holding members 93 and 94, coupling members 96, a bolt 98 and a nut 99.

The sleeve 90 is of a straight-tubular type having an inner diameter equal to the outer diameter of the transporting piping 12, and is provided at opposite end portions thereof with flange portions 90A and 90B, respectively. Each of the gaskets 92 is of a ring shape having a generally trapezoidal section, which is secured to the outer periphery of the transporting piping 12. The flange portions 90A and 90B of the sleeve 90 are provided along the side surface of the gaskets 92.

The holding members 93 and 94 are bent along the outer peripheral surfaces and the other side surfaces of the gaskets 92. The coupling members 96 are made openable by hinge portions 96A, and bent so as to surround the flange portion 90A and the ring member 93 or the flange portion 90B and the ring member 94.

The case where the pipes are abuttedly jointed by use of the piping joint construction will hereunder be described.

First, the sleeve 90, gaskets 92 and holding members 93 and 94 are coupled onto either one of the pipes to be jointed of the transporting piping 12, and thereafter, the pipes of the transporting piping 12 are abutted against each other. An end face of the pipe positioned at the downstream side of the transporting piping 12 at this time is applied thereto with chambering for avoiding a difference in stage due to variability in manufacturing accuracy and for removal of burrs. Subsequently, the sleeve 90 is moved such that the abutted portion is positioned at about the center of the sleeve 90. Furthermore, the gaskets 92 are moved so as to be abutted against the flange portions 90A and 90B of the sleeve 90. Next, the holding members 93 and 94 are moved so as to be abutted against the gaskets 92 positioned at the opposite ends. Thereafter, the flange position 90a and the holding member 93 are clamped by the coupling members 96, similarly the flange portion 90B and the ring 94 are clamped, and these coupling members 96 at the opposite ends are clamped by the bolt 98 and the nut 99, respectively.

Figure 2:
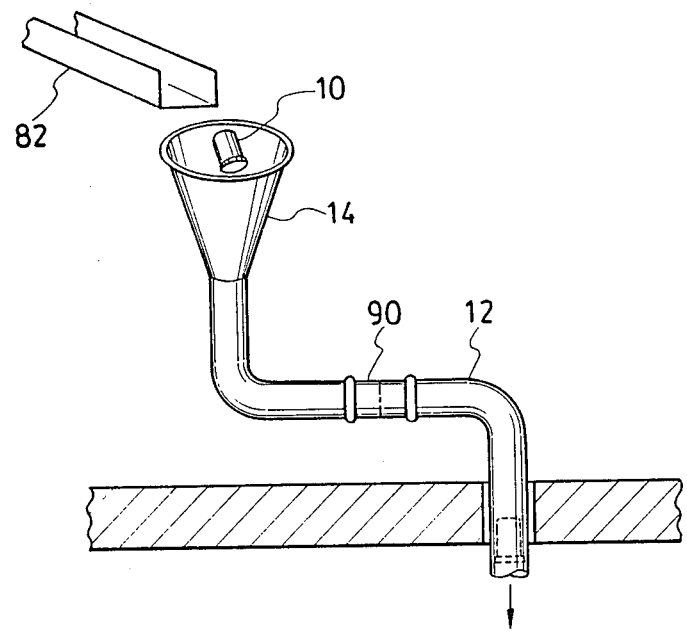
FIG. 2 is schematic view showing the inlet side of the transporting piping illustrated in FIG. 1.

Action of the pneumatic conveying system having the above described construction will hereunder be described. The P cases 10, which are successively discharged from the shooter of the assembling machine 80, are thrown into the receiving opening 14 provided on the inlet side of the transporting piping 12 as shown in FIG. 2, and automatically carried into the transporting piping 12. The P cases 10, which are carried into the transporting piping 12 as described above, are conveyed through the transporting piping 12 by the conveying wind power from the ejector 20. Since the ejector 20 is mounted on the outlet side of the transporting piping 12 and obtains the transporting force under the suction system, the outlet of the transporting piping 12 can avoid being blicked by the P cases 10. Furthermore, the speed of the P case 10 is raised to maximum at a position close to the outlet of the transporting piping 12, however, the speed of the P case 10 is stalled by the stall device 30 such that the impact of the P case 10 at the time of being discharged from the transporting piping 12 becomes satisfactorily small. More specifically, the exhaust fan 36 of the stall device 30 is driven such that the exhaust air flow rate becomes higher than the flow rate of the conveying wind power from the ejector 20, whereby atmosphere is allowed flow into the suction portion 32 from the outlet of the transporting piping 12. The flow of this atmospheric wind (indicated by an arrow A) becomes counter flow wind against the P case 10, whereby braking effect is given to the P case 10 to be stalled. Accordingly, the P case 10 has been in a maximum acceleration condition at the outlet of the ejector 20 when the P case 10 passes through the suction portion 32 of the stall device 30, the P case 10 is stalled by the counter flow wind across the conveying section extending for 600 mm from this suction portion 32 to the outlet of the transporting piping 12, whereby the P case 10 is discharged into the shooter 16 in the substantially natural dropping conditions. Incidentally, according to the experiments where 25 of the P cases 10 were continuously conveyed by use of this pneumatic conveying system, it was ascertained that, when the air pressure at the outlet of the ejector was 0.6 kg/cm$^2$, the speed of the P case 10 became 5.2 m/sec, and, when the opening of the wind regulating valve 38 on the inlet side of the exhaust fan 35 of 0.4 kw was set to 50% and the opening of the wind regulating valve 39 on the outlet side was set to 80%, the P case 10 did not block the pneumatic tube to be reliably conveyed, and were discharged toward the shooter 16 in the substantially natural dropping conditions at the time of being discharged.

The P case 10 discharged into the shooter 16 from the outlet of the transporting piping 12 and discharged onto the distributing conveyor 40 through this shooter 16 as described above are dropped into any one of the small silos A, B and C by the distributing conveyor 40, the scrapers 50 and 60 as described above.

Incidentally, it was ascertained by the experiments that, as size and material quality of the transporting piping 12, SUS 32A (one having a diameter 4 mm larger than the diameter of the P case 10) of JIS was suitable. Furthermore, in order to cope with the worst case of blocking, the transporting piping is secured thereto with a bypass hole for releasing the blocking.

As has been described hereinabove, the pneumatic conveying system according to the present invention has a conveying capacity equal to that of the conventional conveyor conveying, and moreover, can reduce the initial cost of the conveying equipment to about ½. Furthermore, conveying can be performed without blocking the transporting piping with the articles to be conveyed and without damaging the articles.

Furthermore, in the joint construction of the pipes applied to this pneumatic conveying system, any difference in stage and gap occur in the connected portion as compared with the conventional flange joint and joint welding, so that center alignment between the pipes can be accurately and easily effected and the connected portion can be tightly closed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A pneumatic conveying system for pneumatically conveying articles to be conveyed, which are successively discharged from an assembling machine, to a plurality of conveying positions, comprising:
- a distributing conveyor provided along said plurality of conveying positions;
- scrapers for causing said articles to be conveyed on said distributing conveyor to be selectively dropped to any of said plurality of conveying positions;
- a transporting piping provided on the inlet side thereof with a receiving opening for receiving said articles to be conveyed, and provided on the outlet side thereof with a shooter for causing said articles to be conveyed to be dropped down to the front of said distributing conveyor;
- an ejector disposed at a position close to the outlet side of said transporting piping, for sending out a conveying power wind for pneumatically conveying said articles to be conveyed toward the outlet side of said transporting piping; and
- a stall device interposed between said ejector and the outlet side of said transporting piping, said transporting piping having an air ventilation hole formed therein, said stall device including means for inhaling from said air ventilation hole a greater quantity of air than that of said conveying power wind, for stalling the speed of said articles to be conveyed by providing a counter-flow wind from the outlet side of said transporting piping, said outlet side of said transporting piping extending sufficiently far from said air ventilation hole to provide said counter-flow wind,
- wherein said articles to be conveyed are roll film magazines, said roll film magazines being conveyed one at a time.

2. A pneumatic conveying system as set forth in claim 1, wherein said articles to be conveyed are cylindrical cases each housing therein a roll film magazine.

3. A pneumatic conveying system as set forth in claim 1, wherein said transporting piping has an inner diameter about 4 mm larger than an outer diameter of each of said articles to be conveyed.

* * * * *